US008440032B2

(12) United States Patent
Nyberg

(10) Patent No.: US 8,440,032 B2
(45) Date of Patent: May 14, 2013

(54) PRESS AND METHOD FOR FORMING BEAMS HAVING AT LEAST ONE SUBSTANTIALLY U-SHAPED CROSS-SECTIONAL PORTION FROM GLUE-COATED WOOD CHIPS

(75) Inventor: Ulf Nyberg, Stockholm (SE)

(73) Assignee: Newbeam Sweden AB, Soderhamn (SE)

( * ) Notice: Subject to any disclaimer, the term of this patent is extended or adjusted under 35 U.S.C. 154(b) by 148 days.

(21) Appl. No.: 13/141,734

(22) PCT Filed: Dec. 21, 2009

(86) PCT No.: PCT/SE2009/051473

§ 371 (c)(1),
(2), (4) Date: Jun. 23, 2011

(87) PCT Pub. No.: WO2010/074639

PCT Pub. Date: Jul. 1, 2010

(65) Prior Publication Data

US 2011/0253287 A1 Oct. 20, 2011

(30) Foreign Application Priority Data

Dec. 23, 2008 (SE) ...................................... 0802659

(51) Int. Cl.
*B32B 21/02* (2006.01)
*B29C 33/22* (2006.01)
*B29C 33/44* (2006.01)

(52) U.S. Cl.
USPC ........ 156/62.2; 156/581; 264/109; 264/297.8

(58) Field of Classification Search ................. 156/62.2, 156/580, 581; 264/109, 120, 297.8; 425/416, 425/422, 423, 441; 100/218, 232
See application file for complete search history.

(56) References Cited

U.S. PATENT DOCUMENTS 4,544,342 A 10/1985 Werz et al.
4,559,195 A 12/1985 Heggenstaller (Continued)

FOREIGN PATENT DOCUMENTS

DE 1 653 202 A1 6/1972
DE 3 227 074 A1 9/1983

(Continued)

OTHER PUBLICATIONS

International Search Report: mailed Apr. 14, 2010; Appln. PCT/SE2009/051473.

(Continued)

*Primary Examiner* — Michael Tolin
(74) *Attorney, Agent, or Firm* — Ladas & Parry LLP

(57) ABSTRACT

A press having oppositely arranged lower and upper master tools, at least one having an elongate pressing tool which is vertically displaceable in a groove in the master tool, and two lateral pressing tools arranged between the main surfaces of the master tools, on each side of the groove. The press also having at least two mold inserts, arranged on the pressing surface of at least one of the master tools, having the form of an elongate rod extending along substantially the whole of the longitudinal extent of the press and having a substantially U-shaped, outward-facing cross-sectional form, and which are displaceably movable, at least to a limited extent, along the horizontal pressing surface of the master tool transversely to a longitudinal extent of the press, and at least one partition wall arranged between the mold inserts on the pressing surface of at least one of the master tools.

15 Claims, 5 Drawing Sheets

U.S. PATENT DOCUMENTS

| | | | | | |
|---|---|---|---|---|---|
| 4,649,006 | A | * | 3/1987 | Heggenstaller | 264/120 |
| 4,705,472 | A | | 11/1987 | Heggenstaller | |
| 4,980,013 | A | | 12/1990 | Lowery | |

FOREIGN PATENT DOCUMENTS

| | | | |
|---|---|---|---|
| EP | 0 130 359 | A2 | 1/1985 |
| EP | 0 896 866 | A2 | 2/1999 |
| EP | 1 199 141 | A2 | 4/2002 |
| JP | 05-084724 | A | 4/1993 |
| SE | 514962 | C2 | 5/2001 |
| WO | 94/13445 | A1 | 6/1994 |
| WO | 01/21369 | A1 | 3/2001 |
| WO | 2006/100693 | A1 | 9/2006 |

OTHER PUBLICATIONS

Supplementary European Search Report dated Feb. 25, 2013, Appln. No. 09835350.1—1706/2373465 PCT/SE2009051473.

* cited by examiner

Fig 9
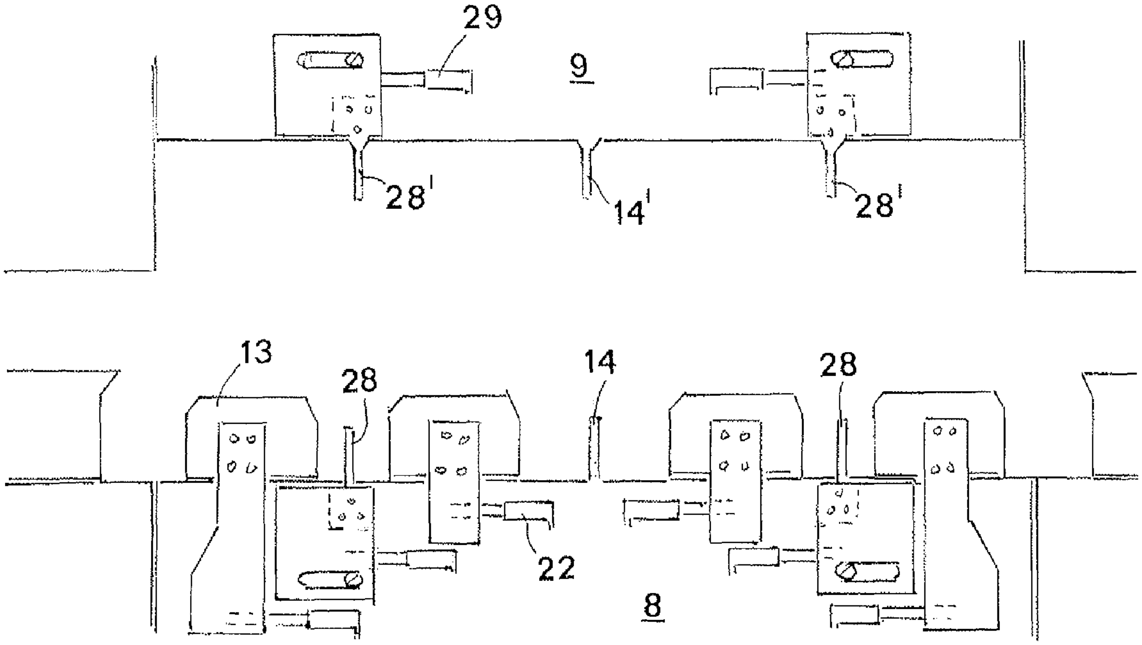
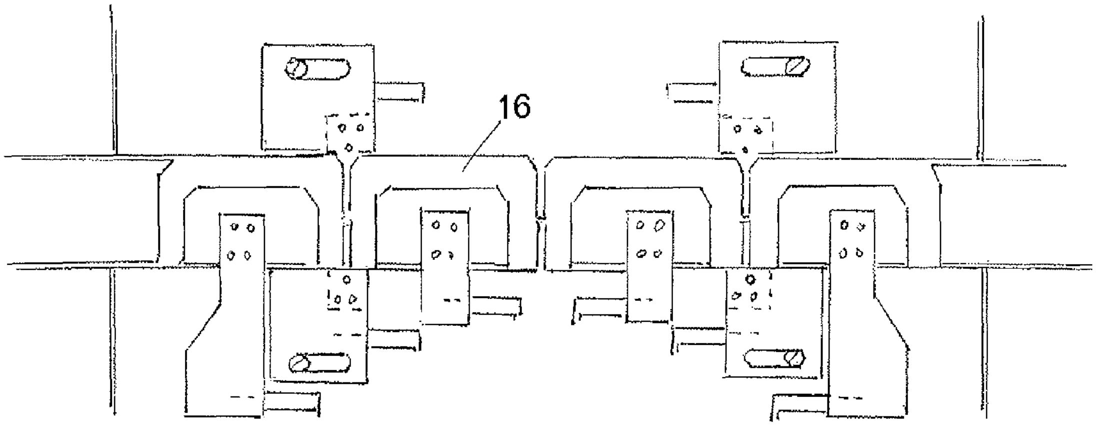
Fig 10

PRESS AND METHOD FOR FORMING BEAMS HAVING AT LEAST ONE SUBSTANTIALLY U-SHAPED CROSS-SECTIONAL PORTION FROM GLUE-COATED WOOD CHIPS

The present invention relates to a press of the kind used for pressing, from glue-coated wood chips, beams or joists which are each configured with at least one substantially U-shaped cross-sectional part, comprising oppositely arranged lower and upper master tools, which each have a plane and horizontal main surface and a pressing surface parallel with the same, wherein the master tools are vertically movable, at least to a limited extent, towards and away from each other, and the main surfaces and pressing surfaces thereof are mutually parallel and facing each other, and wherein at least one of the upper or lower master tools comprises an elongate groove with parallel side faces extending perpendicularly to the main surface, an elongate pressing tool, which comprises the plane, horizontal pressing surface and parallel side faces and which is vertically displaceable in the groove of the master tool in and counter to a pressing direction perpendicular to the main surfaces of the master tools, and two horizontally displaceable lateral pressing tools, which are arranged between the main surfaces of the master tools, on each side of the groove.

The invention also relates to a method for forming beams having at least one substantially U-shaped cross-sectional part from glue-coated wood chips.

BACKGROUND OF THE INVENTION

Presses of the above-stated kind are known by virtue of SE 514 962 and WO2009/131533. Such presses allow strong and light beams and joists of, for example, H-shaped, U-shaped and angular cross section to be pressed from cheap wood chips. The principle for such pressing is that a well-balanced quantity of glue-coated wood chips is placed in the press, whereafter the wood chips are pressed in both the horizontal and vertical direction with the aid of movable pressing tools. As a result of the very high pressing pressures, which can amount to about 5000 bar, heat is generated, and the press is also additionally heated with the aid of, for example, hot steam or oil. This heat causes the glue to harden and, if the pressing pressure is maintained for a few minutes, the wood chips will be formed into a beam or joist of the desired shape.

As a result of the need to maintain the pressing pressure while the glue is setting, the time for a complete pressing cycle is relatively long and can normally amount to about 2-4 min. This means that relatively few beams or joists can be pressed per unit of time and this naturally gives increased costs for each produced unit. There is hence a desire to be able to produce more units per unit of time from one and the same press, especially as the production costs for such a press are high.

SUMMARY OF THE INVENTION

One object of the present invention is to provide a press which is capable of pressing more beams or joists per unit of time. This object, at least, is obtained with a press according to claim 1.

The invention also relates to a method for pressing beams or joists from glue-coated wood chips, with substantially the same object as above. This object, at least, is achieved with a method according to claim 11.

The invention is therefore based on the insight that the above object can be achieved by pressing two or more beams or joists in each press cycle, instead of, as previously, just one beam or joist. The production from one and the same press can thereby be substantially increased. Pressing of two or more beams in each press cycle is enabled by providing the press with two or more mould inserts on the pressing surface of at least one of the master tools of the press, which each have a substantially U-shaped outward-facing cross-sectional form and which are movable, at least to a limited extent, along the pressing surface of the master tool. Moreover, the press is provided with one or more partition walls on the pressing surface of at least one of the master tools, each partition wall extending in the longitudinal direction of the press and perpendicularly to the pressing surface. Each partition wall is placed between two adjacent mould inserts and, in the pressed-together state of the press, the partition wall extends between the pressing surfaces of the lower and upper master tools in such a way that two or more separate pressing chambers are demarcated in the press.

Within the scope of this overall inventive concept, the invention can be varied in many different ways. For example, the mould inserts can be placed loosely on the pressing surface of the lower master tool. The mould inserts are in this case placed in a starting position and, by virtue of gravitational force, will remain in this position as the glue-coated chips are loaded. During the pressing, the mould inserts will subsequently be displaced inwards towards the middle of the master tool as a result of generated pressing forces. In such an embodiment, it can be expedient for the mould inserts to be removed from the press, together with the beams, after each press cycle, whereafter the mould inserts and the pressed beams are separated from one another outside the press. The same mould inserts can subsequently be placed back in the starting position in the press. It can be advantageous, however, if there are several sets of mould inserts, so that, while the mould inserts which have just been removed from the press are being separated from one another, a new set can be placed in the press to allow commencement of the next press cycle and thereby save time. The handling of beams and mould inserts could be carried out manually, but the handling can be more rationally done if the handling takes place mechanically and automatically. Not least, in view of the fact that the mould inserts can weigh relatively heavy. For example, already pressed beams and associated mould inserts could be ejected from the press at the same time as the new mould inserts are inserted and positioned in the correct starting position.

The mould inserts can also, however, be permanently mounted in the press and positioned in the correct starting position at the start of each press cycle with the aid of any suitable positioning device. The positioning device, for example, can utilize the movement of any of the forming tools, as is shown and described in an illustrative embodiment in the following detailed description. In this, embodiments are also shown and described in which the positioning device comprises a force-generating apparatus, such as, for example, a pneumatic cylinder or an electromagnetically operating actuator, which are mounted on the press and expediently act upon the mould inserts at both ends thereof. It would also be possible, however, for the positioning device to be independent from the press or to be built into a pressing tool.

If the press is provided with mould inserts on only one master tool, for example on the lower master tool, it is possible to press beams of U-shaped cross section. With mould inserts also on the second master tool, it is possible to press beams of H-shaped cross section.

Of course, the invention can also be modified in many other ways within the scope of the following patent claims and in relation to the illustrative embodiments which are shown and described in the following detailed description. In the illustrative embodiments, the partition walls are configured, for example, in two parts, i.e. one part which is connected to the lower tool and one part which is connected to the upper tool. A partition wall could also, however, be in a single piece, which is connected, for example, to the lower tool. In the illustrative embodiments, symmetrical pressing of two or more identically equal beams is further shown. It is also perfectly possible, however, to carry out unsymmetrical pressings of two or more beams having different cross-sectional measurements by unsymmetrical placement of the partition wall or walls in relation to the press and by using mould inserts having different cross-sectional measurements. In the following illustrative embodiments, the mould inserts are also shown as homogeneous rods, but they could also have an open cross section inwards towards the pressing surface in order to save material and reduce the weight. The main thing is that the outward-facing cross section is substantially U-shaped. The press in the following illustrative embodiments further has a pressing tool in both the lower and the upper master tool. It would also be possible, however, for just one of the master tools to be provided with a pressing tool.

BRIEF DESCRIPTION OF THE DRAWINGS

A number of embodiments of the invention will be described below with reference to the drawings, in which:

FIGS. 9-10 are schematic end views through a press according to a fifth embodiment in a starting position and a pressing position respectively.

DETAILED DESCRIPTION OF EMBODIMENTS OF THE INVENTION

It should be pointed out that all the figures to which reference is made in the following detailed description for a description of possible embodiments of the invention only show end views of a limited part of the whole press and, more specifically, only the pressing chamber itself and the immediately surrounding parts of the lower and upper master tools and the lateral pressing tools. In reality, of course, the press is appreciably larger, since the master tools must have a considerable thickness and width and the press, moreover, comprises supporting frame parts, force-generating apparatuses, control equipment and the like.

Figure 1:
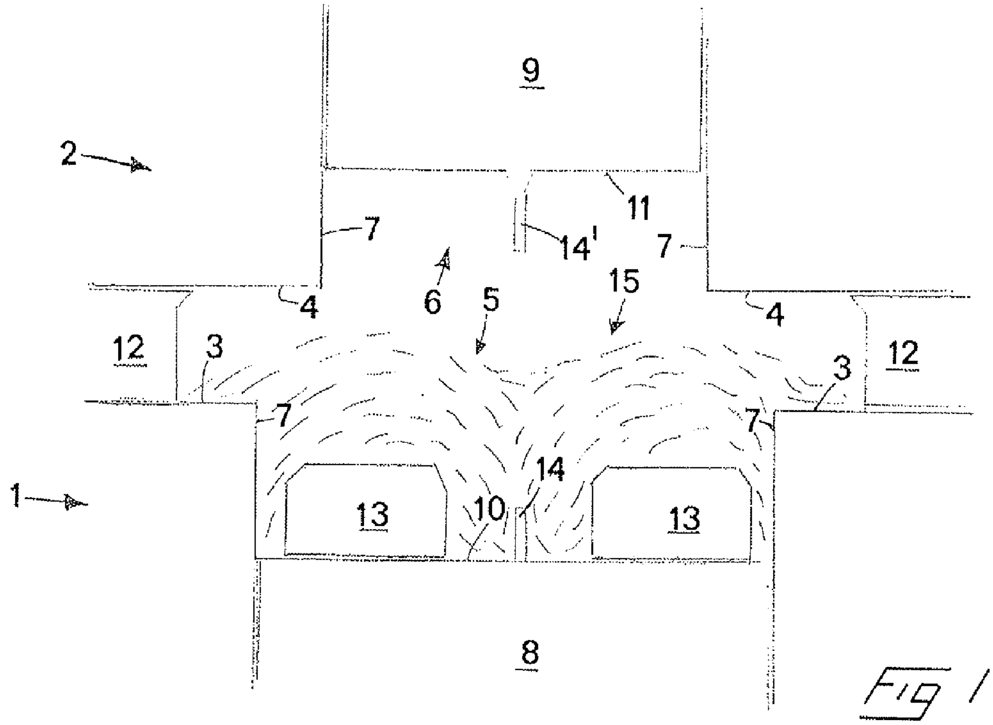
FIGS. 1-2 are schematic end views through a first embodiment of a press in a starting position and a pressing position respectively.
Figure 2:
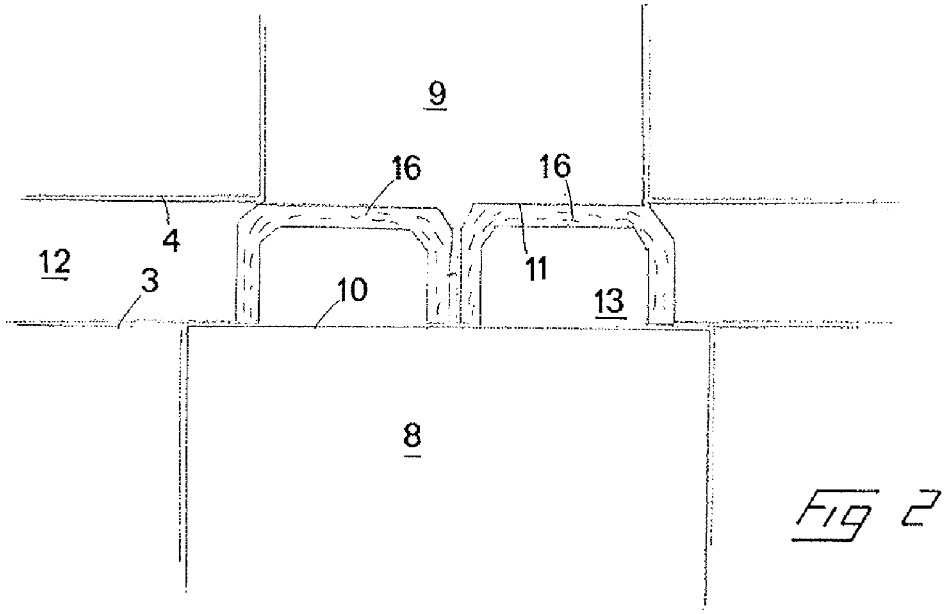

Reference is first made to FIGS. 1 and 2, in which schematic cross sections through a first embodiment of a press according to the invention are shown. The press comprises a lower master tool 1 and an upper master tool 2. Each of the master tools comprises a main surface 3 and 4 respectively and, though this is not shown in FIGS. 1 and 2, the master tools are generally displaceable, at least to a limited extent, in relation to each other, so that they can be distanced somewhat apart for better access during servicing, for example, and dispensing of glue-coated wood chips in the region between the master tools. Each of the master tools has a groove 5 and 6 respectively, which grooves extend in the longitudinal extent of the press and have side faces 7 perpendicular to the respective main surface 3, 4. In each of the grooves 5, 6 there are arranged lower and upper pressing tools 8, 9 respectively, which are displaceable up and down in the grooves perpendicularly to the main surfaces with the aid of force-generating apparatuses (not shown). The upper and lower surfaces on the lower and upper pressing tools 8, 9 form pressing surfaces 10 and 11 respectively, which take part in the pressing of beams and joists. The press also comprises a lateral pressing tool 12 in the space between the master tools on each side of the grooves 10, 11, which lateral pressing tools are laterally displaceable along the main surfaces 3, 4 of the master tools by means of force-generating apparatuses (likewise not shown).

Presses of the above-described kind are previously known and, by forming the lower pressing tool 8 and/or the upper pressing tool 9 with a convex pressing surface, it is possible to press, in each pressing, a beam or joist having one or two U-shaped cross-sectional parts. As a result of the lower and upper pressing tools 8, 9 and the lateral pressing tools 12, the glue-coated chips will be pressed in all directions. It should be pointed out, however, that both of the master tools 1, 2 do not need to be constructed with a pressing tool 8, 9 which is displaceable in a groove 5, 6. It would in fact be possible to arrange one master tool in the form of a plate, in which case its pressing surface can be in the same plane as its main surface 3 or 4.

Instead of, in known manner, configuring the lower and/or upper pressing tools with convex pressing surfaces, in order in each press cycle to press a beam or joist having at least one U-shaped cross-sectional part, according to the invention, the embodiment according to FIG. 1, however, is provided with lower and upper pressing tools 8, 9, having plane pressing surfaces 10, 12. On the plane pressing surface 10 of the lower pressing tool 8 there are placed two mould inserts 13, which have the form of elongate rods extending in the longitudinal extent of the press and having an outward-facing, substantially U-shaped cross section, and which are displaceably arranged on the pressing surface. In the region between the mould inserts 13, there is also arranged a partition wall in the form of a partition wall portion 14, 14' on the pressing surfaces of the respective lower and upper pressing tools, which partition wall portions are fixedly connected to the pressing tools along the centre thereof and have a plane which extends in the direction of the press and in the direction of the pressing direction perpendicular to the pressing surfaces.

In FIG. 1, the press is shown in a starting position in which the mould inserts 13 are somewhat displaced outwards from the centre and the partition wall portion 14 of the lower pressing tool 8 in relation to the final pressing position. The lower and upper pressing tools 8, 9 are also withdrawn into the respective master tool 1, 2, and the lateral pressing tools 12 are displaced laterally outwards from each other. In this position, a well-balanced quantity of glue-coated wood chips 15 is metered out into the pressing chamber demarcated between the master tools and the pressing tools. It is here important not only that the right quantity of glue-coated wood chips is metered out into the pressing chamber, but also that the wood chips are distributed evenly on each side of the respective mould insert 13 in order that the finished beam or joist shall acquire the correct cross-sectional geometry with flanges which are equal in terms of density and cross-sectional measurement. After this, the glue-coated wood chips are pressed by displacing of the lower and upper pressing tools towards each other such that their respective pressing surfaces 10, 11 come level with the main surfaces 3, 4 of the master tools and the lateral pressing tools 12 are displaced inwards towards each other. As a result of the gradually increasing pressing force and compression of the glue-coated wood chips, the mould inserts 13 will here be displaced inwards towards each other. In addition, the height of the respective partition wall portion 14, 14' is tailored such that, in the final pressing position, as shown in FIG. 2, the partition wall portions 14, 14' will meet and, in so doing, will demarcate two separate pressing chambers in the press such that two separate U-shaped beams or joists 16 are thereby formed in one and the same press cycle.

The embodiment according to FIGS. 1 and 2 shows a general configuration of a press according to the invention, in which the mould inserts 13 are placed loosely on the pressing surface 10 of the lower pressing tool 8. Following completed pressing, the press is opened and the pressed beams or joists 16 are freed from the mould inserts. This can be done either directly in the press or by the mould inserts, together with the beams or joists, being removed from the press and separated from each other outside the press. The same mould inserts or a new pair of mould inserts are subsequently placed back on the pressing surface of the lower pressing tool in the correct starting position according to FIG. 1. This positioning of the mould inserts can be realized manually, but it is preferred that some form of automatic positioning device is used, since the mould inserts for reasons of strength, as a result of the high pressing forces, are normally made of metal, preferably steel, and thus acquire a considerable weight. Manual handling is therefore generally too physically taxing and is unacceptably slow for industrial-scale production. Moreover, the pressing takes place at a relatively high temperature of up to 190-200° C. to ensure rapid hardening of the glue, which means that the mould inserts are normally too hot to be fit for manual handling.

Figure 3:
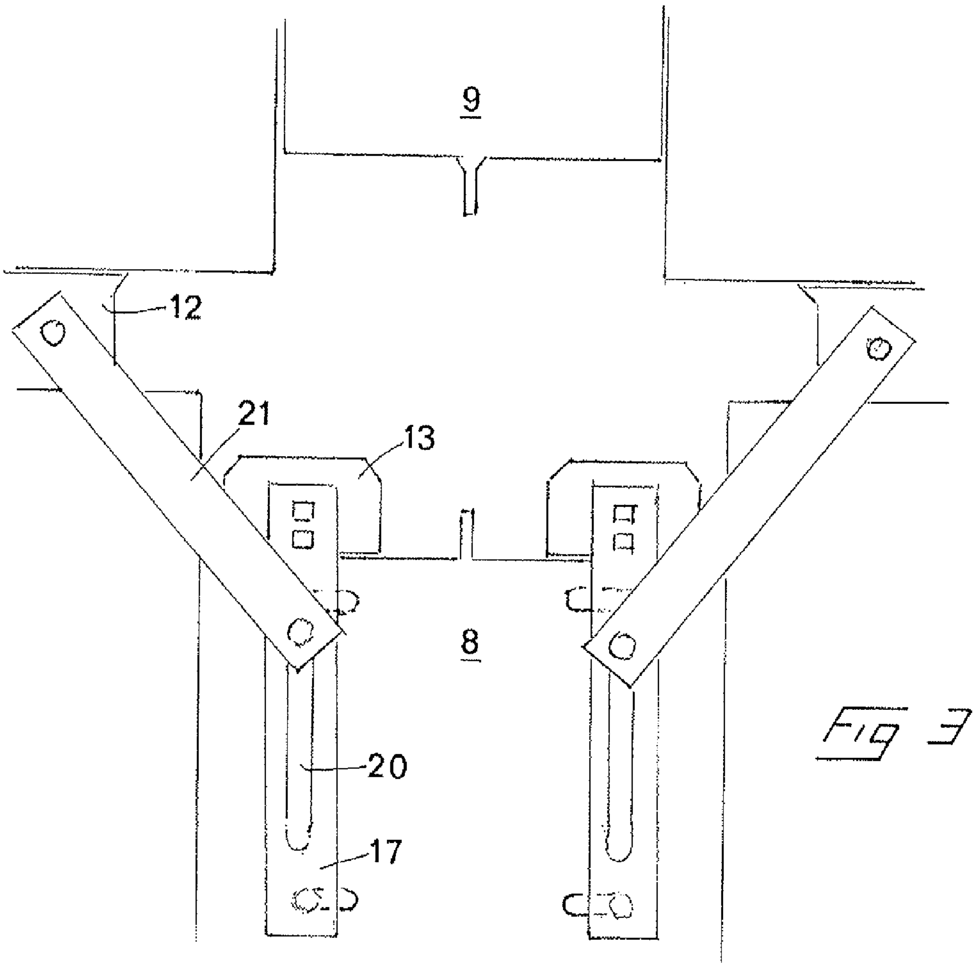
FIGS. 3-4 are schematic end views through a second embodiment in a starting position and a pressing position respectively.
Figure 4:
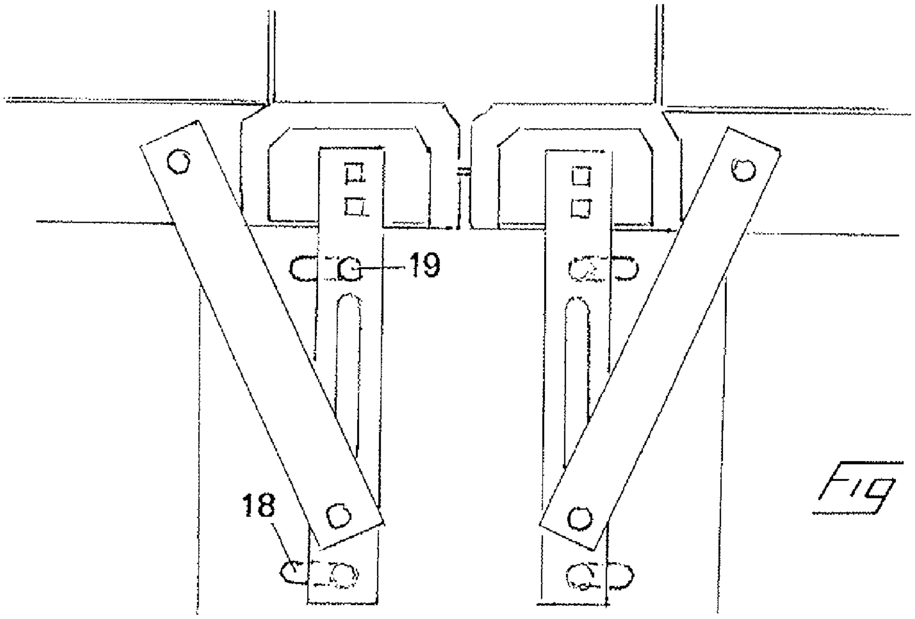

Below, reference is made to FIGS. 3 and 4, in which a second embodiment according to the present invention is illustrated. This embodiment conforms to that which precedes it, apart from the fact that coupled to the respective mould insert 13 is here an automatic positioning device, which attends to automatic positioning of the mould inserts in the starting position after each press cycle. The automatic positioning device utilizes the movement of the lateral pressing tools 12 to restore the mould inserts to the starting position. More specifically, a vertical plate 17 is connected to the end face of the respective mould insert 13 and extends downwards in relation to the latter. Via two horizontal grooves 18 in the end face of the lower pressing tool 8, and two pins 19, which are fixedly connected to the plate 17 and extend into the respective groove 18, the mould inserts 13 are laterally displaceable, to a limited extent, in relation to the press. Each plate is further provided with a vertically continuous groove 20. A force-transmission arm 21 is articulately connected to the end face of the respective lateral pressing tool and is articulately and displaceably connected to the groove 20 of the plate. In the pressing operation, when the press moves from the starting position shown in FIG. 3 to the pressing position shown in FIG. 4, the positioning device will not displace the respective mould insert, but rather these are shifted as a result of the pressing force from the glue-coated chips, which pressure acts upon the mould inserts. Following completed pressing, when the press moves from the pressing position shown in FIG. 4 to the starting position shown in FIG. 3, the positioning device will however draw the mould inserts into the correct starting position. In this embodiment, the pressed beams or joists are separated from the mould inserts in the press, since the mould inserts are permanently fitted in the press.

Below, reference is made to FIGS. 5 and 6 for a description of a third embodiment according to the invention. In this embodiment also, the press is provided with a positioning device for positioning of the mould inserts in the correct starting position after each press cycle. In addition, the upper pressing tool 9 is also provided with mould inserts 13, which are laterally displaceable in relation to the pressing surface of the pressing tool. In this embodiment, the positioning device is not, however, of the type which utilizes the movement of the press to position the mould inserts in the correct starting position, but rather the positioning device is constructed with force-generating apparatuses in the form of hydraulic or pneumatic cylinders 22, which are fixedly connected to the lower and upper pressing tools 8, 9. Expediently, the hydraulic or pneumatic cylinders 22 can be of the one-way operating type, which is capable of displacing the mould inserts from the pressing position shown in FIG. 6 into the starting position shown in FIG. 5 after each press cycle. On the other hand, the hydraulic or pneumatic cylinders have no need to actively displace the mould inserts in the opposite direction, since this is achieved by the acting pressing force. With a press constructed according to FIGS. 5 and 6 having two displaceable mould inserts 13 on the pressing surface 10 of the lower pressing tool 8 and two displaceable mould inserts 13 on the pressing surface 11 of the upper pressing tool 9, as well as a partition wall in the form of a partition wall portion 14, 14' placed on the middle of the respective pressing tool, it is possible to press two H-shaped beams or joists 23 each having two U-shaped cross-sectional parts. A difference between the lower mould inserts 13 and the upper mould inserts 13 is that the lower mould inserts rest on the pressing surface of the lower pressing tool, whilst the upper mould inserts have to be supported by the upper pressing tools so as not to fall down. In the shown illustrative embodiment, this has been achieved by plates fixedly connected to the end faces of the mould inserts, and in the plates for the upper mould inserts 13 there is arranged a horizontal groove, in which can run a pin projecting from the end face of the upper pressing tool.

Figure 5:
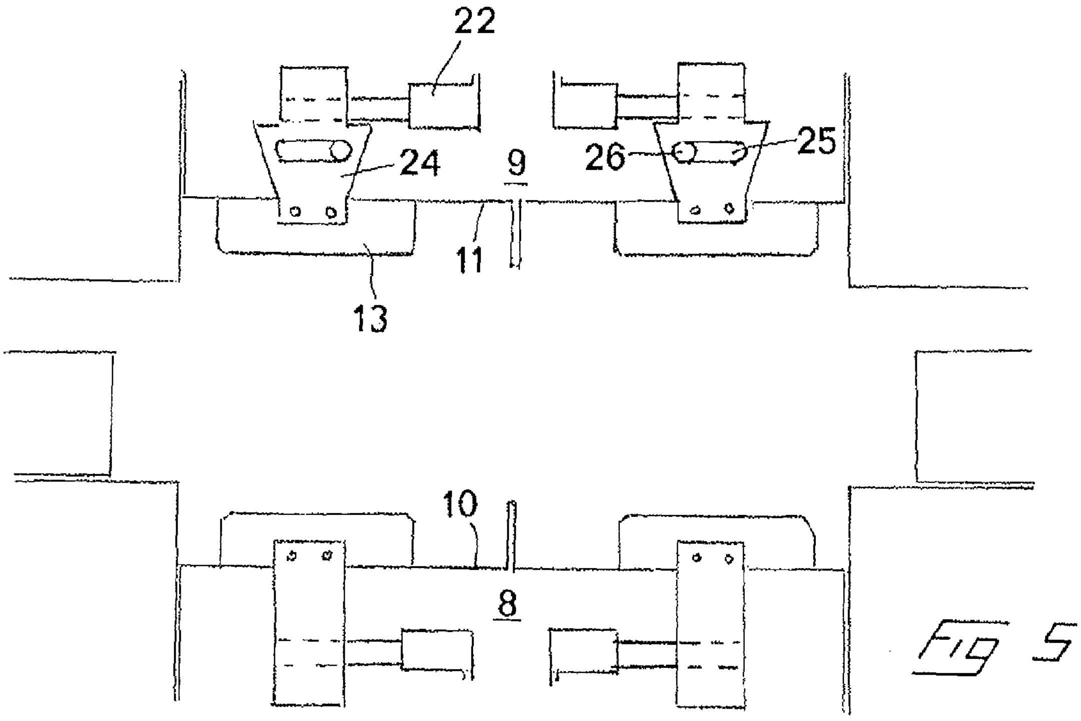
FIGS. 5-6 are schematic end views through a press according to a third embodiment in a starting position and a pressing position respectively.
Figure 6:
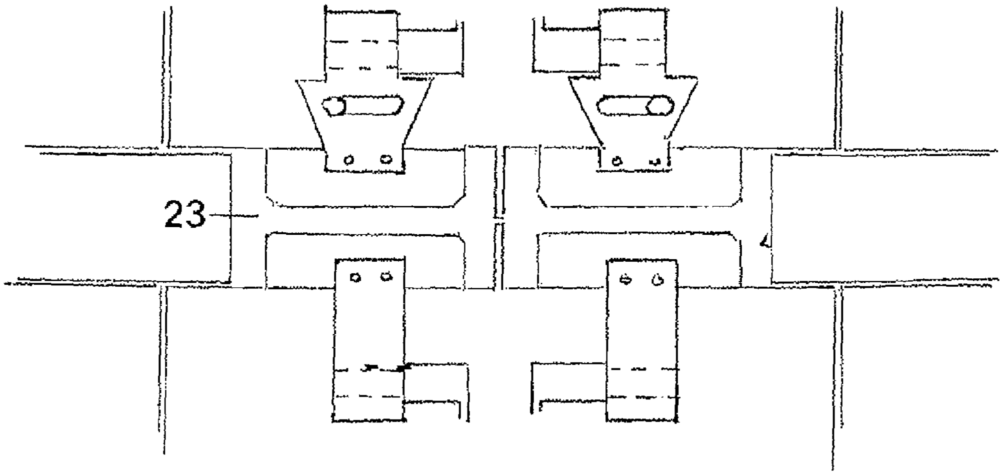
Figure 7:
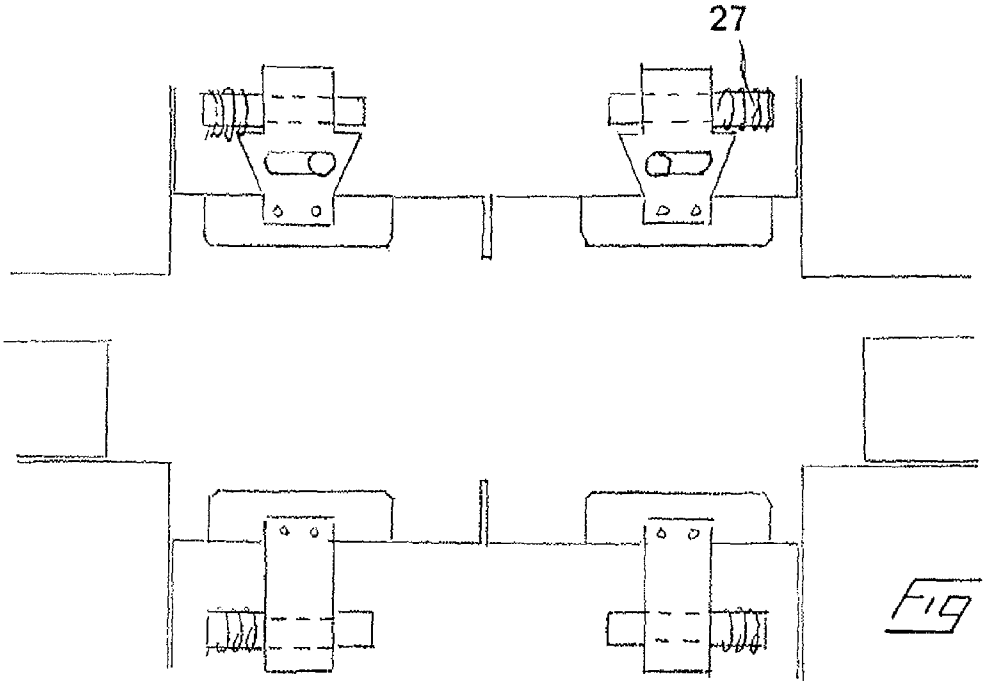
FIGS. 7-8 are schematic end views through a press according to a fourth embodiment in a starting position and a pressing position respectively.
Figure 8:
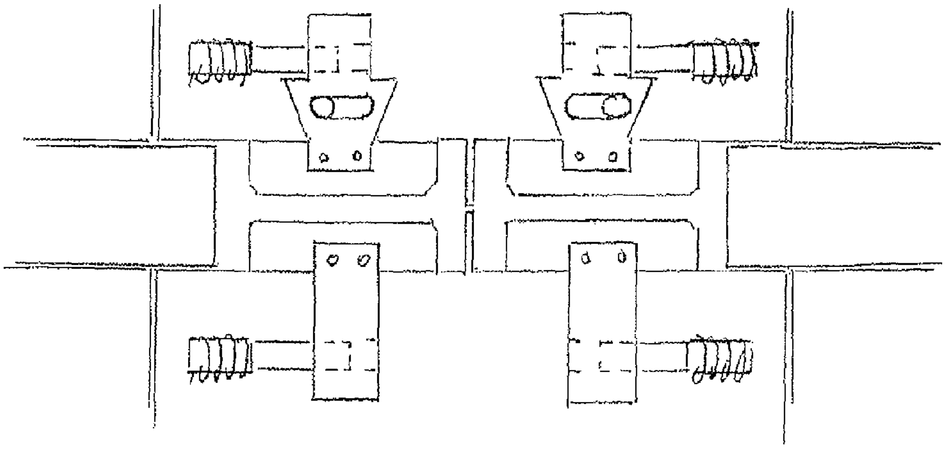

The embodiment according to FIGS. 7 and 8 conforms in principle to the embodiment according to FIGS. 5 and 6, apart from the fact that the force-generating apparatuses 23 are in this case constituted by electromagnetically driven force-generating apparatuses 27.

In FIGS. 9 and 10 is shown a fifth embodiment according to the invention. In this embodiment, it is possible to press four beams or joists 16 of U-shaped cross section in one and the same press cycle. This is made possible by the arrangement of four mould inserts 13 on the pressing surface 10 of the lower pressing tool 8, which are displaceable along the pressing surface transversely to the longitudinal extent of the press and are automatically restorable to the starting position after each press cycle by means of a positioning device comprising a force-generating apparatus 22 similarly to the embodiment according to FIGS. 5 and 6. In order to be able to press four beams or joists in the same pressing process, two more partition walls must, however, be arranged in the press, and at least two of these partition walls, like the mould inserts, must be movably arranged and restorable to the starting position after each press cycle. Hence a first partition wall in the form of two partition wall portions 14, 14' is fixedly arranged on the middle of the respective pressing tool. In addition, a movable partition wall in the form of two partition wall portions 28, 28' is arranged between the first and second, as well as between the third and fourth mould inserts 13. The movable partition wall portions are connected to the respective pressing tool with the aid of plates which are manoeuvred by force-generating apparatuses 29 and are displaceable in relation to the pressing tools via grooves and pins. In the pressed-together state of the press according to FIG. 10, the cross-sectional form of the finished beams can be seen and, in this pressing position, all mould inserts, as well as the two displaceable partition walls, have been displaced in towards the middle of the pressing tools and the middlemost partition wall 14, 14'.

The invention claimed is:

1. Press of the kind used for pressing, from glue-coated wood chips, beams or joists which are each configured with at least one substantially U-shaped cross-sectional part, comprising oppositely arranged lower and upper master tools, which each have a plane and horizontal main surface and a pressing surface parallel thereto, wherein the master tools are vertically movable, at least to a limited extent, towards and away from each other, and the main surfaces and pressing surfaces thereof are mutually parallel and facing each other, and wherein at least one of the upper or lower master tools comprises an elongate groove with parallel side faces extending perpendicularly to the main surface, an elongate pressing tool, which comprises the plane, horizontal pressing surface and parallel side faces and which is vertically displaceable in the groove of the master tool in and counter to a pressing direction perpendicular to the main surfaces of the master tools, and two horizontally displaceable lateral pressing tools, which are arranged between the main surfaces of the master tools, on each side of the groove, wherein the same comprises at least two mould inserts arranged on the pressing surface of at least one of the master tools, each of the mould inserts having the form of an elongate rod extending along substantially the whole of the longitudinal extent of the press and having a substantially U-shaped, outward-facing cross-sectional form, which mould inserts are displaceably movable, at least to a limited extent, along the horizontal pressing surface of the master tool transversely to a longitudinal extent of the press, and further comprises at least one partition wall, which is arranged between the mould inserts on the pressing surface of at least one of the master tools, which extends in the longitudinal extent of the press and in the pressing direction perpendicular to the pressing surfaces of the two master tools, and which, in the pressed-together state of the press, extends between the pressing surfaces of the master tools for demarcation of two separate pressing chambers in the press.

2. Press according to claim 1, wherein the same comprises a positioning device which is capable of positioning the mould inserts in a starting position between two press cycles.

3. Press according to claim 2, wherein the positioning device is permanently connected to the mould inserts which remain in the press between each press cycle as a result of the separation of the pressed beams from the mould inserts and the displacement of these latter, by means of the positioning device, into the starting position after each press cycle.

4. Press according to claim 3, wherein the positioning device achieves displacement of the mould inserts in the direction outwards towards the respective lateral pressing tool after the completed press cycle, but allows free displacement of the mould inserts inwards as a result of generated pressing forces during the pressing.

5. Press according to claim 3, wherein the positioning device comprises a mechanism which utilizes the movement of any one of the pressing tools to displace the mould inserts into the starting position.

6. Press according to claim 3 wherein the positioning device comprises a force-generating apparatus, which is controllable in order to accomplish the outward displacement of the mould inserts after a completed press cycle and which is mounted on the press.

7. Press according to claim 2, wherein the positioning device comprises a force-generating apparatus, which is controllable in order to accomplish the outward displacement of the mould inserts after a completed press cycle and which is separated from the press.

8. Press according to claim 1, wherein the mould inserts are freely supported by the pressing surface of the lower master tool and are removed from the press after each press cycle together with the pressed beams, and the positioning device repositions the mould inserts, or replaces the last used mould inserts with new ones, in the correct starting position on the pressing surface.

9. Press according to claim 1, wherein the same comprises at least four mould inserts, half being arranged on the pressing surface of the lower master tool, whilst half are arranged on the pressing surface of the upper master tool, such that in the pressing operation at least two H-shaped beams are formed, each comprising two U-shaped cross-sectional parts.

10. Press according to claim 1, wherein the same comprises more than two mould inserts and at least two partition walls, at least all partition walls apart from one being displaceable transversely to the longitudinal extent of the press as a result of the pressing force during each press cycle, and being restorable to a starting position, by means of a second positioning device, after each press cycle.

11. Method for pressing, from glue-coated wood chips, beams or joists which are each configured with at least one U-shaped cross-sectional part, comprising the steps of:

providing a press comprising oppositely arranged lower and upper master tools, which each have a plane and horizontal main surface and a pressing surface parallel thereto, wherein the master tools are vertically movable, at least to a limited extent, towards and away from each other, and the main surfaces and pressing surfaces thereof are mutually parallel and facing each other, and wherein at least one of the upper or lower master tools comprises an elongate groove with parallel side faces extending perpendicularly to the main surface, an elongate pressing tool, which comprises the plane, horizontal pressing surface and parallel side faces and which is vertically displaceable in the groove of the master tool in and counter to a pressing direction perpendicular to the main surfaces of the master tools, at least one partition wall, which is arranged on the pressing surface of at least one of the master tools, which extends in the longitudinal extent of the press and in the pressing direction perpendicular to the pressing surfaces of the two master tools, and which, in the pressed-together state of the press, extends between the pressing surfaces of the master tools for demarcation of at least two separate pressing chambers in the press, and two horizontally displaceable lateral pressing tools, which are arranged between the main surfaces of the master tools, on each side of the groove, comprising the steps of:

arranging on the pressing surface of at least one of the master tools at least two mould inserts, extending along substantially the whole of the longitudinal extent of the press, in a starting position, each of the mould inserts having the form of an elongate rod having a substantially U-shaped, outward-facing cross-sectional form and being displaceably movable, at least to a limited extent, along the pressing surface of the master tool transversely to the longitudinal extent of the press; dispensing a well-balanced quantity of glue-coated wood chips into pressing chambers between the pressing tools;

displacing the pressing tools inwards in order to press the glue-coated wood chips into two or more beams, whereupon the mould inserts, as a result of generated pressing forces, will be displaced inwards along the horizontal pressing surface of the master tool from the starting position into a pressing position and take part in the compression of the wood chips mixture;

after a completed press cycle, separating the pressed beams from the mould inserts; and positioning the same or new mould inserts in the starting position on the pressing surface of the master tool prior to the next press cycle.

12. Method according to claim 11, comprising the additional steps of:

removing the mould inserts from the press after a completed press cycle, together with the pressed beams;

separating the pressed beams from the mould inserts; and positioning the last used mould inserts or new mould inserts in the starting position of the pressing surface of the master tool.

13. Method according to claim 11, comprising the additional steps of:

after a completed press cycle, separating the pressed beams from the mould inserts whilst these are detained in the press; and displacing the mould inserts from the pressing position into the starting position.

14. Method according to claim 11, comprising the additional step of:

pressing two or more H-shaped beams, which each comprise two U-shaped cross-sectional parts, through the provision of at least four mould inserts, of which half are positioned on the pressing surface of the lower master tool, whilst half are positioned on the pressing surface of the upper master tool.

15. Method according to claim 11, comprising the additional step of:

displacing the mould inserts from the pressing position into the starting position by utilizing the movement of any one of the pressing tools.

* * * * *